US008316397B2

(12) United States Patent
Jung et al.

(10) Patent No.: US 8,316,397 B2
(45) Date of Patent: Nov. 20, 2012

(54) DIGITAL VIDEO BROADCASTING SYSTEM, DIGITAL VIDEO BROADCASTING TERMINAL, AND METHOD FOR PROVIDING FILE INFORMATION IN FILE DOWNLOAD SERVICE

(75) Inventors: Ji-Wuck Jung, Suwon-si (KR); Young-Jip Kim, Suwon-si (KP); Jin-Woo Jeon, Seongnam-si (KR); Jae-Yeon Song, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 400 days.

(21) Appl. No.: 11/856,832

(22) Filed: Sep. 18, 2007

(65) Prior Publication Data

US 2008/0072254 A1 Mar. 20, 2008

(30) Foreign Application Priority Data

Sep. 18, 2006 (KR) ........................ 10-2006-0090180
Apr. 20, 2007 (KR) ........................ 10-2007-0039066

(51) Int. Cl.

| | |
|---|---|
| ***G06F 3/00*** | (2006.01) |
| ***G06F 13/00*** | (2006.01) |
| ***H04N 5/445*** | (2011.01) |
| ***H04N 7/16*** | (2011.01) |
| ***H04M 11/00*** | (2006.01) |
| ***H04J 99/00*** | (2009.01) |

(52) U.S. Cl. ............. 725/54; 725/62; 455/403; 370/546

(58) Field of Classification Search .................... 725/86, 725/105, 109, 110, 112, 132, 140, 152; 709/217–219
See application file for complete search history.

(56) References Cited

U.S. PATENT DOCUMENTS

| | | | | |
|---|---|---|---|---|
| 6,532,591 | B1 * | 3/2003 | Arai et al. | 725/132 |
| 7,614,068 | B2 * | 11/2009 | Jansky | 725/54 |
| 2006/0053450 | A1 * | 3/2006 | Saarikivi et al. | 725/46 |
| 2006/0225093 | A1 * | 10/2006 | Huttunen et al. | 725/39 |
| 2007/0168534 | A1 * | 7/2007 | Hiltunen et al. | 709/230 |

OTHER PUBLICATIONS

IP Datacast over DVB-H: Electronic Service Guide (ESG), Nov. 2005; http://www.dvb-h.org/PDF/a099.tm3348r2.cbms1199r14.1PDC_ESG.pdf pp. 24-25.*

DVB Organization: GBS0429—aspects of CBMS specifications to consider for metadata tools specification.doc, DVB, Digital Video Broadcasting, C/0 EBU—17A Ancienne Route—Ch-1218 Grand Saconnex, Geneva—Switzerland, May 4, 2006, XP017888572.

DVB Organization: tm-cbms1478 ESG Guideline Document 060826.doc, DVB, Digital Video Broadcasting, C/0 EBU—17A Ancienne Route—Ch-1218 Grand Saconnex, Geneva—Switzerland, Aug. 30, 2006, XP017805579.

* cited by examiner

*Primary Examiner* — Mark D Featherstone
(74) *Attorney, Agent, or Firm* — Jefferson IP Law, LLP

(57) ABSTRACT

A digital video broadcasting system, digital video broadcasting terminal, and method for providing file information in a file download service are provided. To this end, the digital broadcasting system includes a broadcasting server for transmitting an Electronic Service Guide (ESG) comprising a schedule event fragment wherein, if files that provide the file download service comprise a file set generated by grouping at least one file, the schedule event fragment comprises the information about files included in the file set, and a terminal for receiving the ESG, for evaluating the schedule event fragment of the ESG upon receipt of a request for downloadable file information, and for evaluating the information about the files included in the file set and displaying the information if the schedule event fragment comprises the information about the file set.

22 Claims, 17 Drawing Sheets

```
<?xml version="1.0" encoding="UTF-8"?>
<ESGMain xmlns="urn:dvb:ipdc:esg:2005" xmlns:mpeg7="urn:mpeg:mpeg7:schema:2001"
xmlns:tva="urn:tva:metadata:2005"
xmlns:xsi="http://www.w3.org/2001/XMLSchema-instance"
xsi:schemaLocation="urn:dvb:ipdc:esg:2005
I:₩DVBCBM~1₩AMSTER~1₩FINALC~1₩ESGSCH~1.XSD">
    <ESG>
        <ContentTable>
            <Content contentID="cbms://foo.com/RingTone1">
                <Title xml:lang="en">Ring Tone 1</Title>
                <Genre href="urn:dvb:IPDC:CS:ContentCS:5.4.5"/>
                <Duration>PT20S</Duration>
            </Content>
            <Content contentID="cbms://foo.com/RingTone2">
                <Title xml:lang="en">RingTone2</Title>
                <Genre href="urn:dvb:IPDC:CS:ContentCS:5.6"/>
                <Duration>PT30S</Duration>
            </Content>
            <Content contentID="cbms://foo.com/RingTone100">
                <Title xml:lang="en">RingTone100</Title>
                <Genre href="urn:dvb:IPDC:CS:ContentCS:5.4.5"/>
                <Duration>PT30S</Duration>
            </Content>
        </ContentTable>
        <ScheduleEventTable>
          <ScheduleEvent>
            <PublishedStartTime>2006-03-02T20:15:00</PublishedStartTime>
            <PublishedEndTime>2006-03-02T21:00:00</PublishedEndTime>
            <ServiceRef IDRef="cbms://foo.com/Channel1"/>
            <ContentFragmentRef IDRef="cbms://foo.com/RingTone100"/>
            <ContentLocation>http://foo.com/RingTone100.mp3</ContentLocation>
              <ContentFragmentRef IDRef="cbms://foo.com/RingTone1"/>
              <ContentLocation>http://foo.com/RingTone1.mp3</ContentLocation>
              <ContentFragmentRef IDRef="cbms://foo.com/RingTone2"/>
              <ContentLocation>http://foo.com/RingTone2.mp3</ContentLocation>
          </ScheduleEvent>
        </ScheduleEventTable>
        <ServiceTable>
            <Service serviceID="cbms://foo.com/Channel1">
                <ServiceName>Channel1</ServiceName>
                <AcquisitionRef IDRef="cbms://foo.com/Acquisition/Channel1"/>
```

FIG.4A

```
            </Service>
        </ServiceTable>
        <AcquisitionTable>
            <Acquisition contentMimeType="audio/mpeg"
acquisitionID="cbms://foo.com/Acquisition/Channel1">
                <ComponentDescription>
                    <ComponentCharacteristic xsi:type="FileDownloadComponentType"/>
                    <SessionDescription xsi:type="InlinedSDPType">
                        <SDP><![CDATA[v=0
o=foo.com 751092616 751111042 IN IP4 10.45.2.30
s=Ring tone download service
t=0 0
a=flute-ch:1
m=application 12345 FLUTE/UDP 0
c=IN IP4 239.255.255.102/127
a=flute-tsi:98765432
]]></SDP>
                    </SessionDescription>
                </ComponentDescription>
            </Acquisition>
        </AcquisitionTable>
    </ESG>
</ESGMain>
```

FIG.4B

```
<complexType name="ScheduleEventType">
        <sequence>
                <element name="PublishedStartTime" type="dateTime" minOccurs="0"/>
                <element name="PublishedEndTime" type="dateTime" minOccurs="0"/>
                <element name="ServiceRef" type="esg:ESGIDRefType"/>
                <sequence maxOccurs="unbounded">
                        <element name="ContentFragmentRef" type="esg:ESGIDRefType"
minOccurs="0"/>
                        <sequence maxOccurs="unbounded">                              500
                                <element name="AcquisitionRef" type="esg:AcquisitionRefType"
                minOccurs="0"/>
                                <element name="ContentLocation" type="anyURI" minOccurs="0"/>
                        </sequence>
                </sequence>
        </sequence>
        <attribute name="live" type="boolean" use="optional"/>
        <attribute name="repeat" type="boolean" use="optional"/>
        <attribute name="freeToAir" type="boolean" use="optional"/>
        <attribute name="clearToAir" type="boolean" use="optional"/>
        <attribute name="scheduleId" type="anyURI" use="optional"/>
</complexType>
```

FIG.5

```
<complexType name="ScheduleEventType">
    <sequence>
        <element name="PublishedStartTime" type="dateTime" minOccurs="0"/>
        <element name="PublishedEndTime" type="dateTime" minOccurs="0"/>
        <element name="ServiceRef" type="esg:ESGIDRefType"/>
        <sequence maxOccurs="unbounded">
            <element name="ContentFragmentRef" type="esg:ESGIDRefType"
minOccurs="0"/>
            <sequence maxOccurs="unbounded">
                <element name="AcquisitionRef" type="esg:AcquisitionRefType"
        minOccurs="0"/>
                <element name="ContentLocation" type="esg:ContentLocationType"
                    minOccurs="0"/>
            </sequence>
        </sequence>
    </sequence>
    <attribute name="live" type="boolean" use="optional"/>
    <attribute name="repeat" type="boolean" use="optional"/>
    <attribute name="freeToAir" type="boolean" use="optional"/>
    <attribute name="clearToAir" type="boolean" use="optional"/>
    <attribute name="scheduleId" type="anyURI" use="optional"/>
</complexType>
```

600

FIG.6A

610

```
<complexType name="ContentLocationType">
  <sequence>
    <element name="ContentURI" type="esg:ContentURIType" minOccurs="0"/>
    <element name="ContentList" type="esg:ContentListType" minOccurs="0"/>
  </sequence>
</complexType>

<complexType name="ContentURIType">
    <complexContent>
        <extension base="anyURI">
            <attribute name="encodingType" use="optional" default="none">
            <simpleType>
                <restriction base="string">
                    <enumeration value="none"/>
                    <enumeration value="tar"/>
                </restriction>
            </simpleType>
        </extension>
    </complexContent>
</complexType>

<complexType name="ContentListType">
  <sequence>
    <element name="File" type="esg:FileFormatType" minOccurs="0"/>
  </sequence>
</complexType>

<complexType name="FileFormatType">
  <complexContent>
    <extension base="string">
      <attribute name="FileFormat" type="string" use="optional"/>
    </extension>
  </complexContent>
</complexType>
```

FIG.6B

```
<?xml version="1.0" encoding="UTF-8"?>
<ESGMain xmlns="urn:dvb:ipdc:esg:2005" xmlns:mpeg7="urn:mpeg:mpeg7:schema:2001"
xmlns:tva="urn:tva:metadata:2005" xmlns:xsi="http://www.w3.org/2001/XMLSchema-instance"
xsi:schemaLocation="urn:dvb:ipdc:esg:2005
I:₩DVBCBM~1₩AMSTER~1₩FINALC~1₩ESGSCH~1.XSD">
  <ESG>
    <ContentTable>
      <Content contentID="cbms://foo.com/RingToneSet">        700
        <Title xml:lang="en">Ring Tone Set</Title>
        <Genre href="urn:dvb:IPDC:CS:ContentCS:5.4.5"/>
        <Duration>PT20S</Duration>
      </Content>
      <Content contentID="cbms://foo.com/RingTone2">          702
        <Title xml:lang="en">Ring Tone 2</Title>
        <Genre href="urn:dvb:IPDC:CS:ContentCS:5.6"/>
        <Duration>PT30S</Duration>
      </Content>
      <Content contentID="cbms://foo.com/RingTone100">        704
        <Title xml:lang="en">Ring Tone 100</Title>
        <Genre href="urn:dvb:IPDC:CS:ContentCS:5.4.5"/>
        <Duration>PT30S</Duration>
      </Content>
    </ContentTable>
    <ScheduleEventTable>
      <ScheduleEvent>
        <PublishedStartTime>2006-03-02T20:15:00</PublishedStartTime>
        <PublishedEndTime>2006-03-02T21:00:00</PublishedEndTime>
        <ServiceRef IDRef="cbms://foo.com/Channel1"/>                 706
        <ContentFragmentRef IDRef="cbms://foo.com/RingToneSet"/>
        <ContentLocation>
          <ContentURI encodingType="tar">http://foo.com/RingTone.tar</ContentURI>
          <ContentList>
            <File fileFormat="audio/mpeg">ringTone1.mp3</File>      707
  710       <File fileFormat="audio/mpeg">ringTone2.mp3</File>      708
            <File fileFormat="audio/mpeg">ringTone3.mp3</File>
          </ContentList>                                            709
        </ContentLocation>
        <ContentFragmentRef IDRef="cbms://foo.com/RingTone2"/>
        <ContentLocation>
          <ContentURI>http://foo.com/RingTone100.mp3</ContentURI>
        </ContentLocation>
        <ContentFragmentRef IDRef="cbms://foo.com/RingTone100"/>
        <ContentLocation>
          <ContentURI>http://foo.com/RingTone100.mp3</ContentURI>
        </ContentLocation>
      </ScheduleEvent>
    </ScheduleEventTable>
    <ServiceTable>
```

FIG.7A

```
                <Service serviceID="cbms://foo.com/Channel1">
                        <ServiceName>Channel1</ServiceName>
                        <AcquisitionRef IDRef="cbms://foo.com/Acquisition/Channel1"/>
                </Service>
        </ServiceTable>
        <AcquisitionTable>
                <Acquisition contentMimeType="audio/mpeg"
acquisitionID="cbms://foo.com/Acquisition/Channel1">
                        <ComponentDescription>
                                <ComponentCharacteristic xsi:type="FileDownloadComponentType"/>
                                <SessionDescription xsi:type="InlinedSDPType">
                                        <SDP><![CDATA[v=0
o=foo.com 751092616 751111042 IN IP4 10.45.2.30
s=Ring tone download service
t=0 0
a=flute-ch:1
m=application 12345 FLUTE/UDP 0
c=IN IP4 239.255.255.102/127
a=flute-tsi:98765432
]]></SDP>
                                </SessionDescription>
                        </ComponentDescription>
                </Acquisition>
        </AcquisitionTable>
    </ESG>
</ESGMain>
```

FIG.7B

```
- <schema xmlns="http://www.w3.org/2001/XMLSchema" xmlns:esg="urn:dvb:ipdc:esg:2005"
    xmlns:mpeg7="urn:mpeg:mpeg7:schema:2001" xmlns:tva="urn:tva:metadata:2005
  " elementFormDefault="qualified"
   attributeFormDefault="unqualified">
  - <complexType name="ScheduleEventType">
   - <sequence>
       <element name="PublishedStartTime" type="dateTime" minOccurs="0" />
       <element name="PulbishedEndTime" type="dateTime" minOccurs="0" />
       <element name="ServiceRef" type="esg:ESGIDREF" />
     - <sequence maxOccurs="unbounded">
       - <element name="ContentFragmentRef" type="esg:ESGIDRefType" minOccurs="0">
        - <sequence maxOccurs="unbounded">
            <element name="AcquisitionRef" type="esg:AcqusitionRefType" minOccurs="0" />
          <element name="ContentLocation" type="anyURI"minOccurs="0" />     ~810
          <!-- ArchiveLocation-->
          <element name="ArchiveLocation" type="esg:ContentLocationRefType" minOccurs="0" />     ~820
        </sequence>
       </element>
     </sequence>
   </sequence>
   <attribute name="live" type="boolean" use="optional" />
   <attribute name="repeat" type="boolean" use="optional" />
   <attribute name="freeToAir" type="boolean" use="optional" >
   <attribute name="clearToAir" type="boolean" use="optional" />
   <attribute name="scheduleId" type="anyURI" use="optional" />
</complexType>
```

FIG.8A

```
<complexType name="ContentLocationRefType">
- <complexContent>
  - <extension base="anyURI">
      <attribute name="encodingType" use="optional"default="none" />
    - <simpleType>
    - <restriction base="string">
        <enumeration value="gzip" />
        <enumeration value="tar" />
      </restriction>
     </simpleType>
   </extension>
   </complexContent>
   </complexType>
```

FIG.8B

```
<?xml version="1.0" encoding="UTF-8" ?>
- <ESGMain xmlns="urn:dvb:ipdc:esg:2005" xmlns:mpeg7="urn:mpeg:mpeg7:schema:2001"
   xmlns:tva="urn:metadata:2005"xmlns:xsi="http://www.w3.org/2001/XMLSchema-instance"
   xsi:schemaLocation="urn:dvb:ipdc:esg:2005">
  - <ESG>
    - <contentTable>
      - <Content contentID="cbms://foo.com/RingToneSet">  ~910
          <Title xml:lang="en">Ring Tone Set</Title>
          <Genre href="urn:dvb:IPDC:CS:ContentCS:5.4.5" />
          <Duration>PT30S</Duration>
        </Content>
      - <Content contentID="cbms://foo.com/RingTone2">  ~920
          <Title xml:lang="en">Ring Tone 2</Title>
          <Genre href="urn:dvb:IPDC:CS:ContentCS:5.6" />
          <Duration>PT30S</Duration>
        </Content>
      - <Content contentID="cbms://foo.com/RingTone100">  ~930
          <Title xml:lang="en">Ring Tone 100</Title>
          <Genre href="urn:dvb:IPDC:CS:ContentCS:5.4.5" />
          <Duration>PT20S</Duration>
        </Content>
      </contentTable>
    - <ScheduleEventTable>
    - <ScheduleEvent>
        <PublishedStartTime>2006-03-02T20:15:00</PublishedStartTime>
        <PublishedEndTime>2006-03-02T21:00:00</PublishedEndTime>
        <ServiceRef IDRef="cbms://foo.com/Channel1" />
        <ContentFragmentRef IDRef="cbms://foo.com/RingToneSet" />        935
    - <archiveLocation>
      <ContentURI encodingType="tar">http://foo.com/RingTone.tar</ContentURI>
    - <ContentList>                                                        940
        <File fileFormat="audio/mpeg">ringTone1.mp3</File>                      ~970
                                                                          950
        <File fileFormat="audio/mpeg">ringTone2.mp3</File>
                                                                          960
        <File fileFormat="audio/mpeg">ringTone3.mp3</File>
      </ContentList>
    </archiveLocation>
      <ContentFragmentRef IDRef="cbms://foo.com/RingTone2" />
      <ContentLocation>http://foo.com/RingTone100.mp3</ContentLocation>
      <ContentFragmentRef IDRef="cbms://foo.com/RingTone100" />
      <ContentLocation>http://foo.com/RingTone100.mp3</ContentLocation>
    </ScheduleEvent>
   </ScheduleEventTable>
  </ESG>
</ESGMain>
```

FIG.9

```
<complexType name="ScheduleEventType">
- <sequence>
    <element name="PublishedStartTime" type="dateTime" minOccurs="0" />
    <element name="PulbishedEndTime" type="dateTime" minOccurs="0" />
    <element name="ServiceRef" type="esg:ESGIDREF" />
  - <sequence maxOccurs="unbounded">
    - <element name="ContentFragmentRef"" type="esg:ESGIDRefType" minOccurs="0">
      - <sequence maxOccurs="unbounded">
          <element name="AcquisitionRef"type="esg:AcqusitionRefType" minOccurs="0" />
          <element name="ContentLocation" type="anyURI" minOccurs="0" />   ~1010
        - <!-- ArchiveLocation-->
        </sequence>
      </element>
    </sequence>
  </sequence>
  <attribute name="live" type="boolean" use="optional" />
  <attribute name="repeat" type="boolean" use="optional" />
  <attribute name="freeToAir" type="boolean" use="optional" />
  <attribute name="clearToAir" type="boolean" use="optional" />
  <attribute name="scheduleId" type="anyURI" use="optional" />
</complexType>
```

FIG.10A

```
- <schema xmlns="http://www.w3.org/2001/XMLSchema" xmlns:esg="urn:dvb:ipdc:esg:2005"
    xmlns:mpeg7="urn:mpeg:mpeg7:schema:2001" xmlns:tva="urn:tva:metadata:2005" elementFormDefault="qualified"
    attributeFormDefault="unqualified">
  - <complexType name="ContentTableType">
   - <sequence>
      <element name="Content" type="esg:ContentType" minOccurs="0" maxOccurs="unbounded" />
    </sequence>
  </complexType>
- <complexType name="ContentType">
  - <sequence>
     <element name="Title" type="mpeg7:TitleType" minOccurs="0" maxOccurs="unbounded" />
     <element name="MediaTitle" type="mpeg7:TitleMediaType" minOccurs="0" maxOccurs="unbounded" />
     <element name="ServiceRef" type="esg:ServiceRefType" minOccurs="0" maxOccurs="unbounded" />
     <element name="Synopsis" type="tva:SynopsisType" minOccurs="0" maxOccurs="unbounded" />
     <element name="Keyword" type="tva:KeywordType" minOccurs="0" maxOccurs="unbounded" />
     <element name="Genre" type="tva:GenreType" minOccurs="0" maxOccurs="unbounded" />
    <element name="ContentType" type="tva:ControlledTermType" " minOccurs="0" maxOccurs="unbounded" />
  - <!-- ContentLocation -->
    <element name="archiveLocation" type="esg:ContentLocationType" minOccurs="0" maxOccurs="unbounded" />  1020
    <element name="ParentalGuidance" type="mpeg7:ParentalGuidanceType" minOccurs="0" maxOccurs="unbounded" />
    <element name="Language" type="mpeg7:ExtendedLanguageType" minOccurs="0" maxOccurs="unbounded" />
    <element name="CaptionLanguage" type="tva:CaptionLanguageType" minOccurs="0" maxOccurs="unbounded" />
    <element name="SignLanguage" type="tva:SignLanguageType" minOccurs="0" maxOccurs="unbounded" />
    <element name="CreditsList" type="tva:CreditsListType" minOccurs="0" maxOccurs="unbounded" />
    <element name="RelatedMaterial" type="esg:RelatedMaterialType" minOccurs="0" maxOccurs="unbounded" />
    <element name="Duration" type="duration" minOccurs="0" maxOccurs="unbounded" />
    <element name="PrivateData" type="esg:PrivateDataType" minOccurs="0" maxOccurs="unbounded" />
 </sequence>
 <attribute name="contentID" type="anyURI" use="required" />
</complexType>
```

FIG.10B

```
<?xml version="1.0" encoding="UTF-8" ?>
- <ESGMain xmlns="urn:dvb:ipdc:esg:2005" xmlns:mpeg7="urn:mpeg:mpeg7:schema:2001"
   xmlns:tva="urn:metadata:2005" xmlns:xsi="http://www.w3.org/2001/XMLSchema-
   instance" xsi:schemaLocation="urn:dvb:ipdc:esg:2005">
 - <ESG>
  - <contentTable>
   - <Content contentID="cbms://foo.com/RingToneSet">
      <Title xml:lang="en">Ring Tone Set</Title>
      <Genre href="urn:dvb:IPDC:CS:ContentCS:5.4.5" />
      <Duration>PT30S</Duration>
    - <archiveLocation>                                                   1110
      <ContentURI encodingType="tar">http://foo.com/RingTone.tar</ContentURI>
     - <ContentList>                                                      1120    1150
        <File fileFormat="audio/mpeg">ringTone1.mp3</File>
        <File fileFormat="audio/mpeg">ringTone2.mp3</File>                1130
        <File fileFormat="audio/mpeg">ringTone3.mp3</File>
       </ContentList>                                                     1140
      </archiveLocation>
    </Content>
  - <Content contentID="cbms://foo.com/RingTone2">
     <Title xml:lang="en">Ring Tone 2</Title>
     <Genre href="urn:dvb:IPDC:CS:ContentCS:5.6" />
     <Duration>PT30S</Duration>
    </Content>
  - <Content contentID="cbms://foo.com/RingTone100">
      <Title xml:lang="en">Ring Tone 100</Title>
      <Genre href="urn:dvb:IPDC:CS:ContentCS:5.4.5" />
      <Duration>PT20S</Duration>
     </Content>
   </contentTable>
  </ESG>
</ESGMain>
```

FIG.11

DIGITAL VIDEO BROADCASTING SYSTEM, DIGITAL VIDEO BROADCASTING TERMINAL, AND METHOD FOR PROVIDING FILE INFORMATION IN FILE DOWNLOAD SERVICE

PRIORITY

This application claims the benefit under 35 U.S.C. §119 (a) of a Korean Patent Application filed in the Korean Intellectual Property Office on Sep. 18, 2006 and assigned Serial No. 2006-90180 and a Korean Patent Application filed in the Korean Intellectual Property Office on Apr. 20, 2007 and assigned Serial No. 2007-39066, the entire disclosures of both of which are hereby incorporated by reference.

BACKGROUND OF THE INVENTION

1. Field of the Invention

The present invention relates to an apparatus and method for a digital video broadcasting system. More particularly, the present invention relates to a digital video broadcasting system, digital video broadcasting terminal, and method for providing information about downloadable files using an Electronic Service Guide (ESG) in a file download service.

2. Description of the Related Art

Generally, in a digital broadcasting system, a broadcasting signal, which has been conventionally transmitted in an analog manner, is transmitted in a digital manner. A broadcasting signal transmitted in a digital manner provides superior quality and provides various services for both video and audio. Digital broadcasting is classified as Digital Video Broadcasting (DVB), Digital Audio Broadcasting (DAB), Digital Multimedia Broadcasting (DMB), MediaFLO, and the like. DVB is a European digital broadcasting standard and can be classified into various forms according to its nature, such as DVB-Terrestrial (DVB-T), DVB-Satellite (DVB-S), and DVB-Handheld (DVB-H). DVB-T is a standard for terrestrial digital broadcasting, DVB-S is a standard for satellite digital broadcasting, and DVB-H is a standard for portable mobile digital broadcasting.

DVB-H is a technology standard established for the transmission of digital signals to handheld devices such as mobile terminals and the like. DVB-H provides excellent reception of terrestrial digital broadcasting to handheld devices (i.e. mobile terminals). Moreover, it can be used to implement digital mobile multimedia broadcasting to provide high-quality video and audio content to users anytime and anywhere, for example while driving or walking.

Unlike other digital broadcasting standards, DVB-H transmits important information required for a broadcasting service through Electronic Service Guide (ESG) data. DVB-H uses a File Delivery over Unidirectional Transport (FLUTE) protocol as a Content Delivery Protocol (CDP). The FLUTE protocol allows transmission of files such as text, audio, video and image files. As part of its standard, DVB-H uses the FLUTE protocol to download files required for ESG configuration and ESG update.

DVB-H provides video broadcasting and audio broadcasting as fundamental broadcasting services. In addition, DVB-H provides a data broadcasting service. In other words, three types of services, i.e., video service, audio service and data service, can be provided by the DVB-H standard. Information about each of the three services is transmitted through ESG information. A terminal, for example a handheld device, receiving a DVB-H broadcasting signal, analyzes ESG information included in the broadcasting signal in order to recognize the type of service transmitted through the broadcasting signal and service related information. The ESG information includes Extensible Markup Language (XML) data, and the format of ESG XML information is defined using an XML scheme in the standard.

DVB-H broadcasting information is transmitted as ESG fragment information. An ESG fragment can be classified into various types according to the information included in the ESG fragment. ESG data defined in the DVB-H service includes 7 fragments, i.e., a service bundle fragment, a purchase fragment, a purchase channel fragment, a service fragment, a schedule event fragment, a content fragment, and an acquisition fragment. The terminal collects these fragments together in order to recognize all of the information contained in the DVB-H broadcasting signal.

A DVB-H broadcasting service includes a data broadcasting service. A data broadcasting service is a file download service that involves downloading a particular data file transmitted through a broadcasting signal. In the file download service, file data required for a service, such as an HTML page, Audio/Video (AV) files, and ring tones, in addition to a streaming service, is transmitted using the FLUTE protocol. In order to acquire file data used for a particular period of time, a FLUTE session is initiated using Session Description Protocol (SDP) information of the ESG data and the desired file data is transmitted. In the file download service, information required for the file download service is transmitted using the service fragment, the schedule event fragment, the content fragment, and the acquisition fragment of the ESG data.

FIGS. 4A and 4B illustrate an ESG for a DVB-H file download service. Uniform Resource Identifier (URI) information for each transmission file is transmitted through a schedule event fragment. It can be seen from FIGS. 4A and 4B that a download service for three ring tone MP3 files, i.e., a Ring Tone 1, a Ring Tone 2, and a Ring Tone 100, is provided. More specifically, it can be seen from FIGS. 4A and 4B that URI information for each MP3 file is transmitted through a content location element of the schedule event fragment. As can be seen from FIGS. 4A and 4B, information required to provide the download service for the three MP3 files is transmitted through the content fragment, the service fragment, the schedule event fragment, and the acquisition fragment. FIG. 5 illustrates the syntax of a general ESG schedule event fragment. Referring to FIG. 5, a content location element 500 of the schedule event fragment has information about the type of any URI and can indicate URI information of a single service file.

As such, when the current DVB-H system provides file information for a download service using an ESG, it can provide information about a download service for a single file as illustrated in FIGS. 4A and 4B. However, when several individual files are grouped together for download in the file download service, there is no way to provide information about each of the several files included in the grouped file. As a result, when a set of several files is provided in a file download service, information about each of the several files included in the set may not be provided.

For example, when a service provider offers 10 ring tone MP3 files, grouped together as a single file, to a user for purchase, the user may desire to evaluate information about each of the 10 ring tone MP3 files, i.e., a file list, before paying for and downloading the 10 ring tone MP3 files. However, according to the current DVB-H Convergence of Broadcast and Mobile Services (CBMS) ESG standard, when a terminal is provided with several files grouped as a single file, there is no way to provide information about each of the individual files of the grouped file, thus resulting in a failure to provide sufficient information to the user.

SUMMARY OF THE INVENTION

The present invention has been made to address at least the above problems and/or disadvantages and to provide at least the advantages described below. Accordingly, an object of the present invention is to provide a digital video broadcasting system, terminal, and method for providing information about a plurality of files grouped as a single file through an ESG.

According to one aspect of the present invention, a digital broadcasting system for providing file information in a file download service using broadcasting information is provided. The digital broadcasting system includes a broadcasting server for transmitting an Electronic Service Guide (ESG) comprising a schedule event fragment wherein, if files that are included in the file download service comprise a file set that is generated by grouping a plurality of files, the schedule event fragment comprises information about the plurality of files included in the file set, and a terminal for receiving the ESG, for evaluating the schedule event fragment of the ESG upon receipt of a request for downloadable file information, and for evaluating and displaying the information about the plurality of files included in the file set if the schedule event fragment comprises the information about the file set.

According to another aspect of the present invention, a digital broadcasting system for providing file information in a file download service using broadcasting information is provided. The digital broadcasting system includes a broadcasting server for transmitting an Electronic Service Guide (ESG) comprising a content fragment wherein, if files that are included in the file download service comprise information about a file set generated by grouping a plurality of files, the content fragment comprises information about the plurality of files included in the file set and a terminal for receiving the ESG, for evaluating the content fragment of the ESG upon receipt of a request for downloadable file information, and for evaluating and displaying the information about the plurality of files included in the file set if the content fragment comprises the file set.

According to another aspect of the present invention, a method for providing file information in a file download service using broadcasting information is provided. The method includes transmitting, by a broadcasting server, an Electronic Service Guide (ESG) comprising a schedule event fragment wherein, if files that are included in the file download service comprise information about a file set generated by grouping a plurality of files, the schedule event fragment comprises information about the plurality of files included in the file set, receiving, by a terminal, the ESG, determining, by the terminal, if a request for downloadable file information is input, determining, by the terminal, if the content fragment comprises the information about the file set by evaluating the schedule event fragment if the request for the downloadable file information is input, and evaluating and displaying, by the terminal, the information about the files included in the file set if the schedule event fragment comprises the file set.

According to another aspect of the present invention, a method for providing file information in a file download service using broadcasting information is provided. The method includes transmitting, by a broadcasting server, an Electronic Service Guide (ESG) comprising a content fragment wherein, if files that are included in the file download service comprise information about a file set generated by grouping a plurality of files, the content fragment comprises information about the plurality of files included in the file set, receiving, by a terminal, the ESG, determining, by the terminal, if a request for downloadable file information is input, determining, by the terminal, if the content fragment comprises the information about the file set by evaluating the content fragment if the request for the downloadable file information is input, evaluating and displaying, by the terminal, the information about the files included in the file set if the content fragment comprises the file set.

According to another aspect of the present invention, a terminal for providing file information of files in a file download service using broadcasting information is provided. The terminal includes a receiver for receiving an Electronic Service Guide (ESG), a memory unit for storing the received ESG, a display unit for displaying input data, and a controller for evaluating a schedule event fragment of the received ESG to determine whether the ESG comprises information about a file set, for evaluating information about files included in the file set if the ESG comprises the information about the file set, and for displaying the information through the display unit.

BRIEF DESCRIPTION OF THE DRAWINGS

The above and other features and advantages of exemplary embodiments of the present invention will be more apparent from the following detailed description taken in conjunction with the accompanying drawings, in which:

FIGS. 4A and 4B illustrate an ESG for a general ESG file download service;

FIG. 5 illustrates the syntax of a general ESG schedule event fragment;

FIGS. 6A and 6B illustrate the syntax of an ESG schedule event fragment including file list information of a file set including a plurality of sub files according to an exemplary embodiment of the present invention;

FIGS. 7A and 7B illustrate an ESG using the syntax of the ESG schedule event fragment illustrated in FIGS. 6A and 6B according to an exemplary embodiment of the present invention; and FIGS. 8A and 8B illustrate the syntax of an ESG schedule event fragment including file list information of a file set including a plurality of sub files according to an exemplary embodiment of the present invention;

FIG. 9 illustrates an ESG using the syntax of the ESG schedule event fragment illustrated in FIGS. 8A and 8B according to an exemplary embodiment of the present invention;

FIGS. 10A and 10B illustrate the syntax of a content fragment including file list information of a file set including a plurality of sub files according to an exemplary embodiment of the present invention;

FIG. 11 illustrates an ESG using the syntax of the content fragment illustrated in FIGS. 10A and 10B according to an exemplary embodiment of the present invention.

Throughout the drawings, the same drawing reference numerals will be understood to refer to the same elements, features and structures.

DETAILED DESCRIPTION OF EXEMPLARY EMBODIMENTS

The matters defined in the description such as a detailed construction and elements are provided to assist in a comprehensive understanding of exemplary embodiments of the invention. Accordingly, those of ordinary skill in the art will recognize that various changes and modifications can be made to what is described herein without departing from the scope and spirit of the invention. Also, descriptions of well-known functions and constructions are omitted for clarity and conciseness.

In an exemplary method of the present invention, a terminal receives an ESG schedule event fragment or a content fragment. If the ESG schedule event fragment or the content fragment includes information indicating that a file set, including several files and file list information corresponding to the several files in the file set, is provided as part of a file download service, the file list information is evaluated in order to provide information about each of the several files included in the file set to a user.

Figure 1:
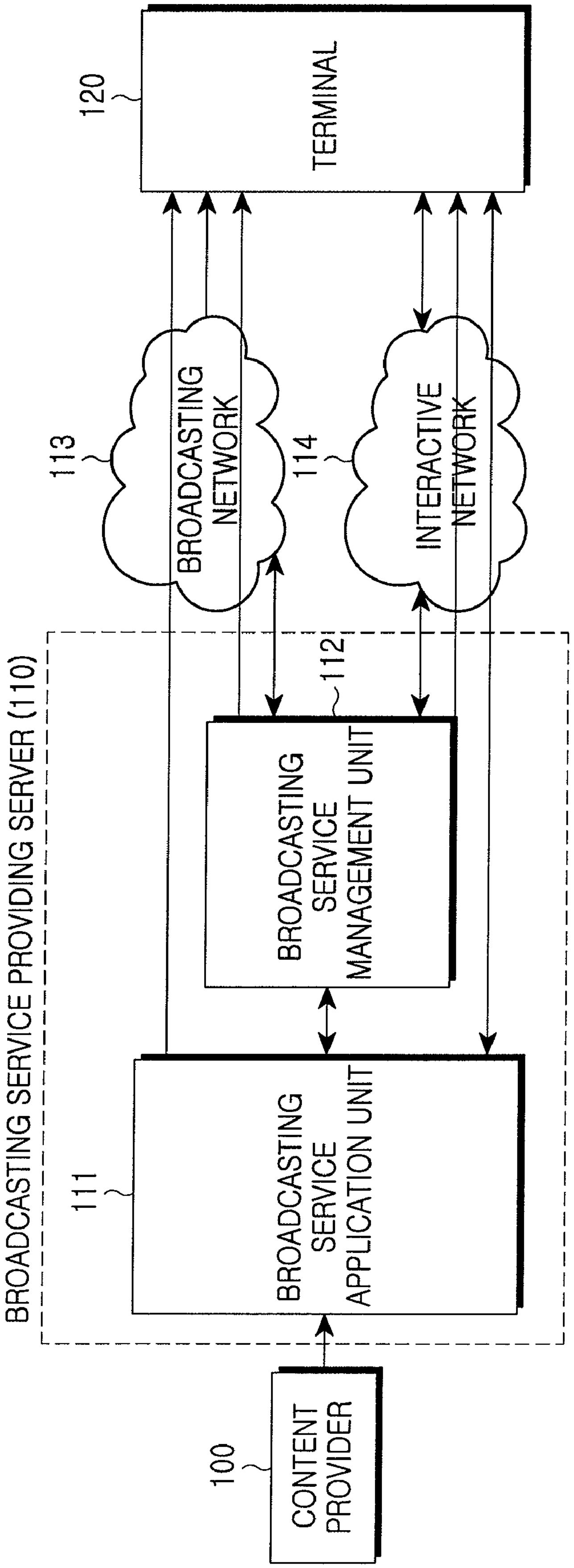
FIG. 1 is a block diagram illustrating a digital video broadcasting system according to an exemplary embodiment of the present invention.

FIG. 1 is a block diagram illustrating the structure of a digital video broadcasting system according to an exemplary embodiment of the present invention.

As shown in FIG. 1, the digital video broadcasting system includes a broadcasting service providing server 110 for generating a Transport Stream (TS) for content provided by a content provider 100 and broadcasting the generated TS, a broadcasting network 113 for broadcasting the TS from the broadcasting service providing server 110 to a terminal 120, and the terminal 120 for receiving the broadcasted TS and performing a digital broadcasting service using the TS. The broadcasting service providing server 110 includes a broadcasting service application unit 111 and a broadcasting service management unit 112. The broadcasting service application unit 111 transmits an audio/video stream and file data to the terminal 120, and the broadcasting service management unit 112 transmits ESG data to the terminal 120.

According to an exemplary embodiment of the present invention, a file download service provides a set of several files from a service provider that are made as a single file. When the single file, comprised of the several files, is provided, the broadcasting service providing server 110 transmits an ESG including an ESG schedule event fragment or a content fragment that contains information indicating transmission of the file set and file list information corresponding to each of the several files in the set to the terminal 120.

Upon receipt of the ESG, the terminal 120 determines if information indicating the transmission of a file set is included in the ESG schedule event fragment. If so, the terminal 120 evaluates the file list information corresponding to the file set in order to provide the file list information to the user.

The following detailed description includes several exemplary embodiments in which the broadcasting service providing server 110 incorporates information about a file set into an ESG. In an exemplary embodiment of the present invention, information about a file set is provided using a content location element of a schedule event fragment. In another exemplary embodiment of the present invention, information about a file set is provided using a content location element indicating information of a single file instead of a file set and an archive location element indicating information of a file set. In yet another exemplary embodiment of the present invention, an archive location element is defined in a content fragment.

First, a method for providing information about a file set according to an exemplary embodiment of the present invention will be provided.

When several files are transmitted as a file set according to an exemplary embodiment of the present invention, the syntax of an ESG schedule event fragment transmitted by the broadcasting service providing server 110 can be configured as illustrated in FIGS. 6A and 6B. Referring to FIGS. 6A and 6B, the ESG schedule event fragment according to an exemplary embodiment of the present invention includes not only URI information of a download file using a content location element, but also includes information about the files included in the file set if the download file is a file set.

In a content location element 600 of an ESG schedule event fragment according to an exemplary embodiment of the present invention, a content URI type element includes information about an encoding type used to group the several files into the file set in order to allow the terminal 120 to determine whether the received file is a file set that includes several files. In an exemplary embodiment illustrated in FIGS. 6A and 6B, an algorithm used for grouping the several files into a file set is a tar algorithm. Of course, other algorithms may be used. The encoding type may be set to “none” by default, and thus an encoding type attribute may be omitted in the transmission of a single file.

In other words, as indicated by 600, the ESG schedule event fragment according to an exemplary embodiment of the present invention includes information about an encoding type used to group several files into a file set as an encoding type in a content URI type element and includes file list information corresponding to the file set in a content list type element.

An ESG using the syntax of the ESG schedule event fragment as illustrated in FIGS. 6A and 6B will now be described with reference to FIGS. 7A and 7B.

FIGS. 7A and 7B illustrate an ESG for providing information about a file set using a content location element of the ESG schedule event fragment illustrated in FIGS. 6A and 6B according to an exemplary embodiment of the present invention. A description will be made of an example in which an ESG is transmitted that includes information about a Ring Tone Set that is a file set, information about a ring Tone 2 and information about a ring Tone 100. Also as part of the example, the service provider transmits three MP3 files, i.e., a ring Tone 1, a ring Tone 2, and a ring Tone 3, as the Ring Tone Set, to a user.

A content fragment then includes information indicating that a Ring Tone set including three MP3 files is provided as indicated by 700, information indicating that a Ring Tone 2 is provided as indicated by 702, and information indicating that a Ring Tone 100 is provided as indicated by 704.

A schedule event fragment includes information about the three files of the Ring Tone Set. In particular, the schedule event fragment includes a content URI encoding type and a content list corresponding to the file set as indicated by 710. In the information 710, 706 indicates the content URI encoding type corresponding to the file set and 707, 708 and 709 indicate information about the files included in the file set, i.e., information about the ring Tone 1, information about the ring Tone 2, and information about the ring Tone 3, respectively.

Upon receipt of the ESG as illustrated in FIGS. 7A and 7B, the terminal 120 can evaluate a content URI encoding type to recognize that, out of the received files, a file corresponding to a ring tone set includes several files that are grouped using a tar algorithm. The terminal 120 can also recognize which files are included in the Ring Tone Set by evaluating a content list before a downloading operation is performed.

Next, a method for providing information about a file set according to another exemplary embodiment of the present invention will be described.

In order to transmit several files as a file set that is a single file according to an exemplary embodiment of the present invention, the syntax of a schedule event fragment transmitted by the broadcasting service providing server 110 is as shown in FIGS. 8A and 8B. In this exemplary embodiment, an element indicating information about a single file and an element indicating information about a file set are separately used.

Referring to FIG. 8A, a content location element is used for a single file having no file set as indicated by 810, and an archive location element is used for a single file having a file set as indicated by 820. The content location element and the archive location element may also be used separately for a single file having no file set or a single file having a file set. When file information to be provided is a file set, basic information may be first provided using a content location element and then detailed information of the file set may be provided using an archive location element, as agreed between a service provider and a terminal.

The archive location element has the same content location type information as in the previous exemplary embodiment of the present invention. In other words, although not shown in FIGS. 8A and 8B, by using "esg:ContentLocationRefType" as archive location element type information, information about an encoding type used for grouping files may be included as an encoding type in a content URI type element according to the previous exemplary embodiment of the present invention and file list information corresponding to a file set may be included in a content list type element according to the previous exemplary embodiment of the present invention.

FIG. 8B illustrates a modified content URI type element for an exemplary embodiment of the present invention. In other words, in the previous exemplary embodiment of the present invention, a value indicating that an encoding type is "none" is included in order to indicate a single file that is not a file set as shown in FIG. 6B. However, in an exemplary embodiment of the present invention, a single file that is not a file set is indicated using a content location element as shown in FIG. 8B and thus a content URI type element shown in FIG. 8B does not need to include a value indicating that an encoding type is "none".

Hereinafter, an ESG using the syntax of the schedule event fragment as shown in FIGS. 8A and 8B will be described with reference to FIG. 9.

FIG. 9 illustrates an ESG for a file download service using the schedule event fragment as shown in FIGS. 8A and 8B according to an exemplary embodiment of the present invention. A description will be made of an example in which an ESG is transmitted that includes information about a Ring Tone Set, information about a ring Tone 2, and information about a ring Tone 100. Also as part of the example, the service provider transmits three MP3 files, i.e., a ring Tone 1, a ring Tone 2, and a ring Tone 3, as the Ring Tone Set that is a single file, to a user.

A content fragment then includes information indicating that a Ring Tone Set including three MP3 files is provided as indicated by 910, information indicating that a Ring Tone 2 is provided as indicated by 920, and information indicating that a Ring Tone 100 is provided as indicated by 930.

A schedule event fragment includes information about the three files of the Ring Tone Set. In particular, unlike in the previous exemplary embodiment of the present invention, a content URI encoding type and a content list corresponding to the file set as indicated by 910 use an archive location element as indicated by 970 in an exemplary embodiment of the present invention. In other words, an archive location element is used for a file set and a content location element is used for other cases. In the information 970, 935 indicates the content URI encoding type corresponding to the file set as indicated by 910 and 940, 950, and 960 indicate information about the files included in the file set, i.e., information about the ring Tone 1, information about the ring Tone 2, and information about the ring Tone 3, respectively.

Next, a method for providing information about a file set according to an exemplary embodiment of the present invention will be described.

In order to transmit several files as a single file set according to an exemplary embodiment of the present invention, the syntax of a schedule event fragment and the syntax of a content fragment transmitted by the broadcasting service providing server 110 are as shown in FIGS. 10A and 10B. Here, an exemplary embodiment of the present invention is different from the previous exemplary embodiment of the present invention in that the archive location element is included in a content fragment instead of a schedule event fragment. In other words, in the previous exemplary embodiment of the present invention, information about a file set is provided in a content fragment indicating information of the file set, instead of recognizing file set information of content according to each schedule in a schedule event fragment. Referring to FIG. 10B, the archive location element is included in the content fragment as indicated by 1020. In the schedule event fragment, a content location element is used to indicate a single file using an "AnyURI" type as indicated by 1010 in FIG. 10A.

Hereinafter, an ESG using the syntax of a content fragment shown in FIGS. 10A and 10B will be described with reference to FIG. 11.

FIG. 11 illustrates an ESG using the syntax of the content fragment illustrated in FIGS. 10A and 10B according to an exemplary embodiment of the present invention. A description will be made of an example in which an ESG is transmitted that includes information about a Ring Tone Set, information about a ring Tone 2, and information about a ring Tone 100. Also as part of the example, content locations of the three files are transmitted through the content fragment and the service provider transmits three MP3 files, i.e., a ring Tone 1, a ring Tone 2, and a ring Tone 3, as the Ring Tone Set that is a single file, to a user.

A content fragment then includes information indicating that a Ring Tone set including three MP3 files is provided.

The content fragment includes information about the three files and a content URI encoding type and a content list corresponding to a file set is included in an archive location element as indicated by 1150. In the information 1150, 1110 indicates a content URI encoding type of the file set and 1120, 1130, and 140 indicate information about each of the three files, i.e., information about a ring Tone 1, information about a ring Tone 2, and information about a ring Tone 3.

Hereinafter, the structure of a terminal 120 according to an exemplary embodiment of the present invention will be described with reference to FIG. 2. An exemplary terminal 120 is a digital video broadcasting terminal.

Figure 2:
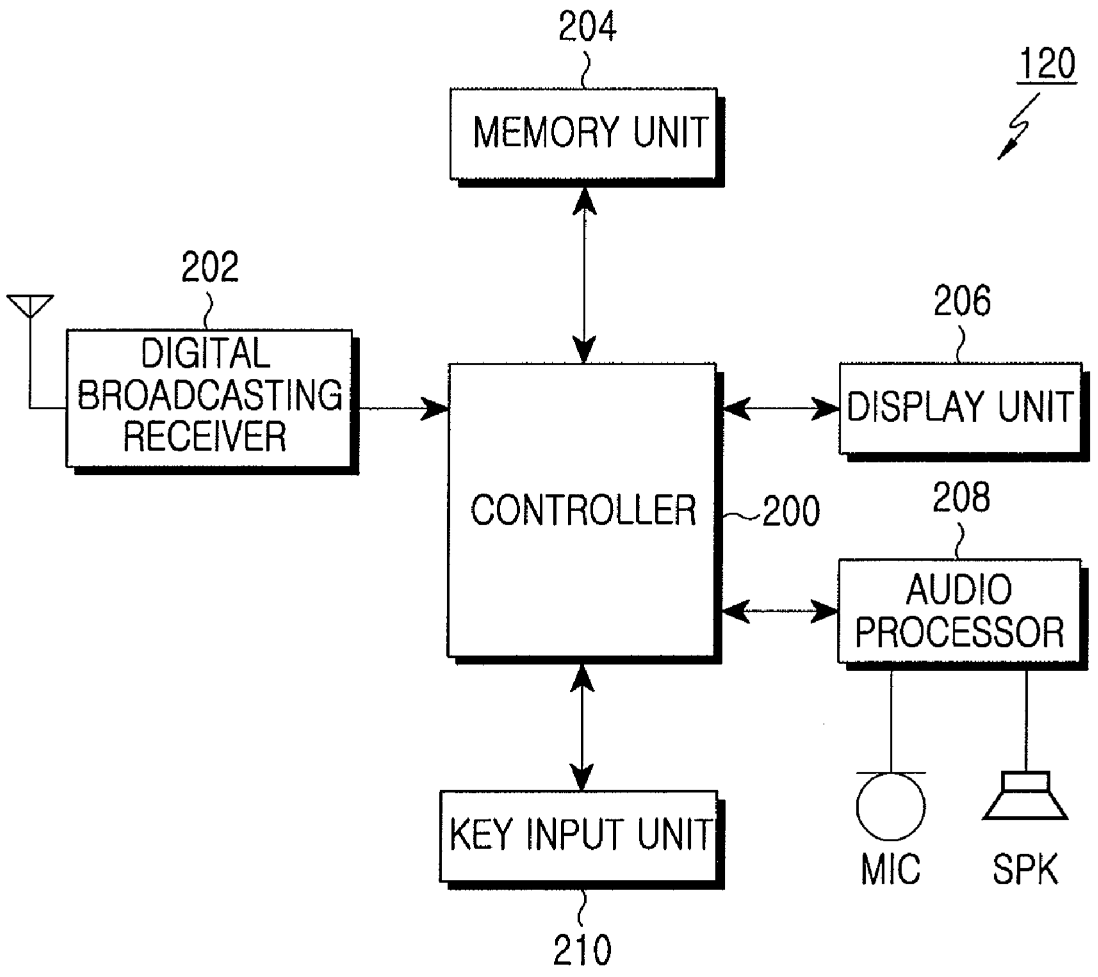
FIG. 2 is a block diagram illustrating a digital video broadcasting terminal according to an exemplary embodiment of the present invention.

FIG. 2 is a block diagram illustrating an exemplary digital video broadcasting terminal 120. The digital video broadcasting terminal 120 includes a digital broadcasting receiver 202, a memory unit 204, a controller 200, a key input unit 210, a display unit 206, and an audio processor 208.

Once a broadcasting channel is selected through use of the controller 200, the digital broadcasting receiver 202 receives and demodulates digital broadcasting data from the broadcasting channel and outputs the demodulated digital broadcasting data to the controller 200. In an exemplary embodiment of the present invention, the digital broadcasting system is a DVB-H broadcasting system and the digital broadcasting receiver 202 is a DVB-H Orthogonal Frequency Division Multiplex (OFDM) demodulator. In such an exemplary system, the OFDM demodulator performs OFDM demodulation on a signal received from a broadcasting station that broadcasts DVB-H broadcasting data and outputs digital broadcasting data of a channel selected by a user. The digital broadcasting receiver 202 receives an ESG data stream included in a digital broadcasting TS broadcasted by a digital broadcasting device. The terminal 120 may also include a Radio Frequency (RF) unit (not shown) including an RF transmitter for up-converting and amplifying the frequency of a transmission signal, and an RF receiver for low-noise amplifying and down-converting the frequency of a reception signal.

The memory unit 204 stores data required by the controller 200 and, in particular, stores file download service information included in ESG data received from the broadcasting service providing server 110.

Figure 3:
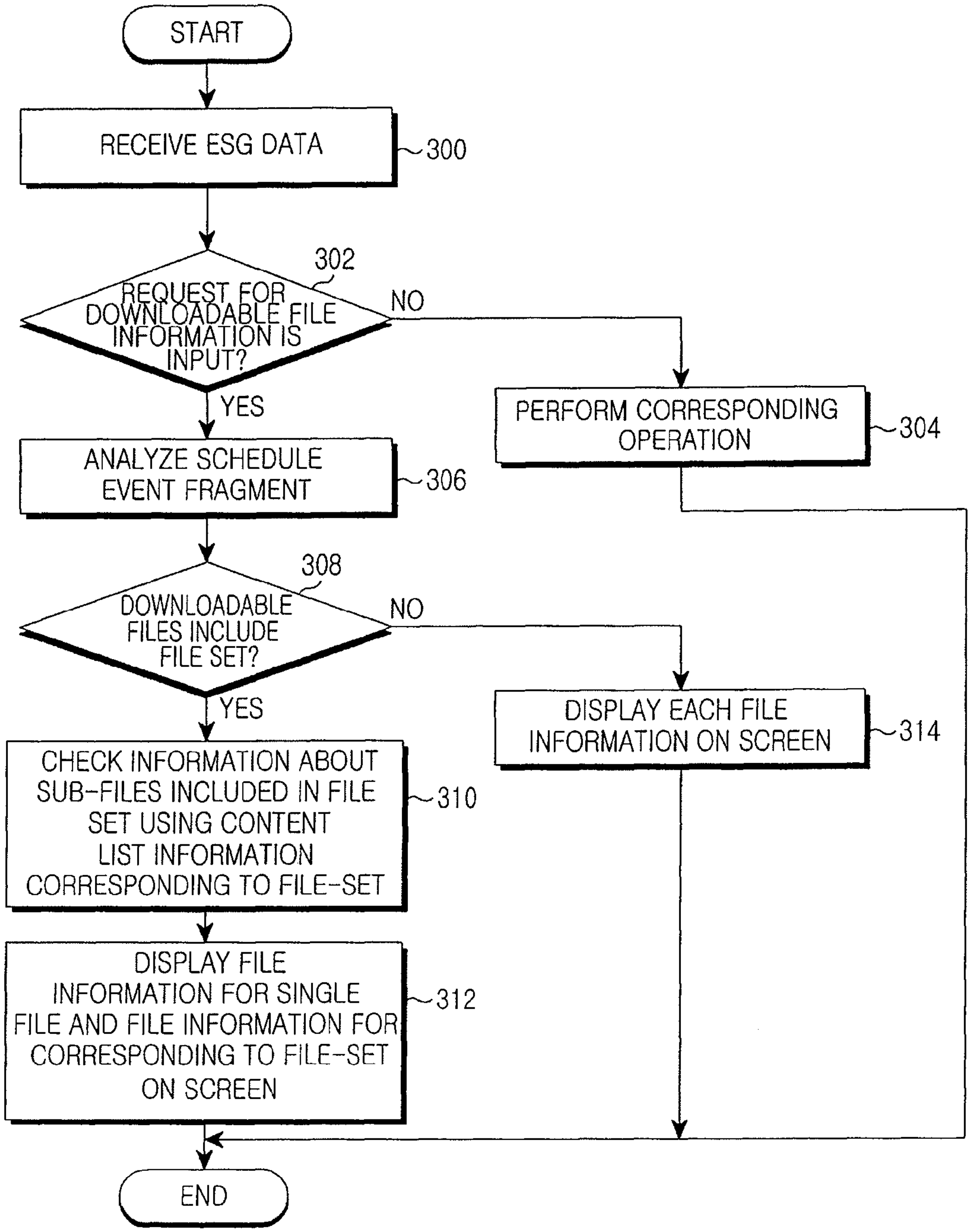
FIG. 3 is a flowchart illustrating a process of providing file information during a file download service in a digital video broadcasting terminal according to an exemplary embodiment of the present invention.

The controller 200 controls the overall operation of the digital video broadcasting terminal 120, decodes a digital broadcasting stream output from the digital broadcasting receiver 202, and outputs the decoded digital broadcasting stream through the display unit 206 and the audio processor 208. The terminal 120 may also include a video signal processor (not shown) and an audio signal processor (not shown) for respectively processing decoded video and audio signals. In an exemplary embodiment, if information indicating the transmission of a file set is included in an ESG schedule event fragment or a content fragment generated by the broadcasting service providing server 110, the controller 200 performs a control operation in such a way as to evaluate file list information corresponding to the file set and to provide the file list information to the user. A detailed operation of the controller 200 for evaluating information about a file set provided through an ESG schedule event fragment or a content fragment by the broadcasting service providing server 110 and providing information about the file set to the user will be described later with reference to FIG. 3.

The key input unit 210 receives a user manipulation signal, such as a key input, and transmits the received user manipulation signal to the controller 200.

The display unit 206 outputs display data generated in the digital video broadcasting terminal 120. In an exemplary embodiment, the display unit 206 is a Liquid Crystal Display (LCD) for sufficiently supporting the resolution of broadcasting data. When an LCD is implemented with a touch screen, the display unit 206 may also serve as an input unit.

The audio processor 208 modulates an electric signal input from a microphone into voice data, and demodulates encoded voice data input from the digital broadcasting receiver 202 into an electric signal and outputs the electric signal to a speaker. The audio processor 208 may include a data codec for processing packet data and an audio codec for processing an audio signal such as voice. In an exemplary embodiment, the audio processor 208 is included in the controller 200.

Hereinafter, an exemplary operation of the digital video broadcasting terminal 120 for providing file information to the user in a file download service will be described with reference to FIGS. 3 and 7A through 12.

In step 300, once the digital video broadcasting terminal 120 receives ESG data through the digital broadcasting receiver 202, the controller 200 stores the received ESG data in the memory unit 204.

The controller 200 determines if a request for viewing information about downloadable files is input from a user in step 302. If so, step 306 is performed. If not, the controller proceeds to step 304 and a corresponding operation is performed.

At the request of the user in step 302, the controller 200 proceeds to step 306 and analyzes a schedule event fragment or a content fragment in the ESG data stored in the memory unit 204. In this step, the controller 200 analyzes a schedule event fragment or a content fragment. In step 308, the controller 200 determines if the analysis result with respect to the schedule event fragment or the content fragment in the ESG data indicates that the downloadable files include a file set. Although a schedule event fragment is first analyzed and then a content fragment is analyzed in a general ESG data analysis, the analysis of step 306 is performed on the schedule event fragment or the content fragment in order to determine if the downloadable files include a file set.

If the controller 200 receives the ESG generated according to an exemplary embodiment of the present invention, it determines if one of the downloadable files is configured as a file set by evaluating a content URI encoding type element including encoding information as indicated by 710 of FIG. 7A. If the downloadable files do not include a file set and each of the downloadable files is a single file, the controller 200 displays information about each of the downloadable files on a screen using a general file information display method in step 314.

If the controller 200 receives the ESG generated according to an exemplary embodiment of the present invention, it determines if one of the downloadable files is configured as a file set by evaluating a file set list included in an archive location element of a schedule event fragment as indicated by 970 of FIG. 9.

If the controller 200 receives the ESG generated according to an exemplary embodiment of the present invention, it determines if one of the downloadable files is configured as a file set by evaluating a file set list included in an archive location element of a content fragment as indicated by 1150 of FIG. 11.

If it is determined in step 308 that the downloadable files do include a file set as well as single files, in step 310 the controller 200 displays file information for the downloadable files, each of which is a single file, using a general file information display method. Also in step 310, the controller evaluates file information for sub-files included in the file set. As part of the evaluation, the controller 200 evaluates information about the sub-files included in the file set using a content list element corresponding to the file set. If the controller receives the ESG generated according to an exemplary embodiment of the present invention, by checking information 707, 708, and 709 included in a content list as illustrated in FIG. 7A, the controller 200 recognizes that the sub files are ringTone 1, ringTone 2, and ringTone 3, respectively. If the controller 200 receives the ESG generated according to an exemplary embodiment of the present invention, by checking information 940, 950, and 960 included in a content list as illustrated in FIG. 9, the controller 200 recognizes that the sub files are ringTone 1, ringTone 2, and ringTone 3, respectively. If the controller 200 receives the ESG generated according to an exemplary embodiment of the present invention, by checking information 1120, 1130, and 1140 included in a content list as illustrated in FIG. 11, the controller 200 recognizes that the sub files are ringTone 1, ringTone 2, and ringTone 3, respectively.

Figure 12:
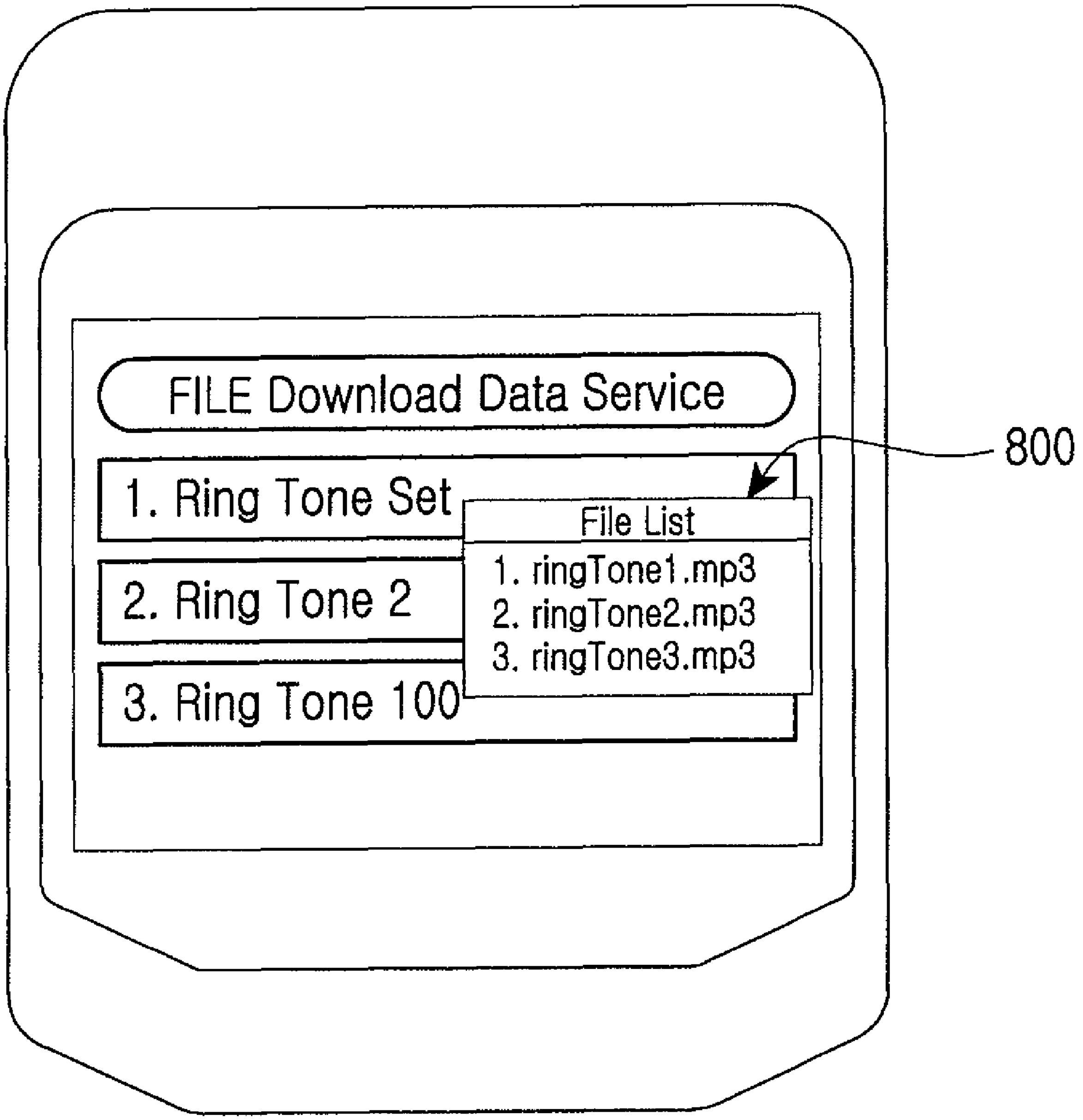
FIG. 12 illustrates a screen displaying information of each file that is made as a single file and information of sub files included in a file set according to exemplary embodiments of the present invention.

The controller 200 then displays file information for the sub-files included in the file set through the display unit 206 in step 312. The display of the file information for the sub-files may be simultaneous with the display of the information of the single files. For example, the screen of the digital video broadcasting terminal 120 may display the file information as illustrated in FIG. 12. In other words, general file information is displayed for the files, i.e., "2. Ring Tone 2" and "3. Ring Tone 100", each of which is a single file, and file list information of the sub files included in the Ring Tone Set, i.e., "ringTone 1.mp3, ringTone 2.mp3, and ringTone 3.mp3", is displayed for the file set "1. Ring Tone Set" as a popup window. The file list information of the sub-files for the file set "1. Ring Tone Set" may be displayed as a popup window 800 simultaneously with the file information for the other files as illustrated in FIG. 12, or may be displayed as a popup window upon a user's key click or cursor dragging.

As described above, according to exemplary embodiments of the present invention, for a download service using broadcasting information, several files may be transmitted as a file set, thereby improving the efficiency of file transmission when compared to transmitting the files separately. Furthermore, when several files are serviced as a file set, information about the files included in the file set is provided through ESG information, thereby allowing the user to evaluate the information about the files included in the file set before downloading the files.

While the invention has been shown and described with reference to exemplary embodiments thereof, it will be understood by those skilled in the art that various changes in form and details may be made therein without departing from the spirit and scope of the invention as defined by the appended claims and their equivalents.

What is claimed is:

1. A digital broadcasting system for providing file information in a file download service using broadcasting information, the digital broadcasting system comprising:

a broadcasting server for transmitting an Electronic Service Guide (ESG) comprising a schedule event fragment including file information about at least one file included in a file set and information indicating transmission of the file set, wherein the file set is generated by grouping the at least one file provided by the download service; and a terminal for receiving the ESG, for evaluating the schedule event fragment of the ESG upon receipt of a request for downloadable file information, and for evaluating the information about the at least one file included in the file set and displaying the information if the schedule event fragment comprises the information about the file set, wherein the broadcasting server incorporates information about a single file into a content location element of the schedule event fragment when the file set comprises only the single file, and incorporates at least one of a content Uniform Resource Identifier (URI) type element comprising information about an encoding type used to group the files included in the file set and a content list type element comprising file list information corresponding to the file set into an archive location element of the schedule event fragment when the file set comprises more than one file.

2. The digital broadcasting system of claim 1, wherein when the file set comprises a single file, the broadcasting server sets an encoding type value included in the content URI type element as a value for indicating that the file set comprises only the single file.

3. The digital broadcasting system of claim 1, wherein if the terminal determines that the information about the file set is included in the received ESG, it evaluates the file list information corresponding to each of the files included in the information about the file set through the content list type element.

4. The digital broadcasting system of claim 1, wherein the terminal determines if the information about the file set is included in the received ESG by evaluating the archive location element.

5. The digital broadcasting system of claim 4, wherein when the file set comprises more than one file, the terminal evaluates file list information corresponding to each of the files included in the information about the file set through the content list type element.

6. A digital broadcasting system for providing file information in a file download service using broadcasting information, the digital broadcasting system comprising:

a broadcasting server for transmitting an Electronic Service Guide (ESG) comprising a content fragment including file information about at least one file included in a file set and information indicating transmission of the file set, wherein the file set is generated by grouping the at least one file provided by the file download service; and a terminal for receiving the ESG, for evaluating the content fragment of the ESG upon receipt of a request for downloadable file information, and for evaluating the information about the at least one file included in the file set and displaying the information if the content fragment comprises the file set, wherein the broadcasting server incorporates information about a single file into a content location element of the schedule event fragment when the file set comprises only the single file, and incorporates at least one of a content Uniform Resource Identifier (URI) type element comprising information about an encoding type used to group the files included in the file set and a content list type element comprising file list information corresponding to the file set into an archive location element of the content fragment when the file set comprises more than one file.

7. The digital broadcasting system of claim 6, wherein the terminal determines if the content fragment comprises the information about the file set by evaluating the archive location element of the content fragment.

8. The digital broadcasting system of claim 7, wherein when the terminal determines that the ESG comprises the information about the file set, the terminal evaluates the file list information corresponding to each of the files included in the information about the file set through the content list type element.

9. A method for providing file information in a file download service using broadcasting information, the method comprising:

receiving, from a broadcasting server by a terminal, an Electronic Service Guide (ESG) comprising a schedule event fragment including file information about at least one file included in a file set and information indicating transmission of the file set, wherein the file set is generated by grouping the at least one file provided by the file download service;

determining, by the terminal, if a request for downloadable file information is input;

determining, by the terminal, if the schedule event fragment comprises the information about the file set by evaluating the schedule event fragment when the request for the downloadable file information is input; and evaluating, by the terminal, the information about the at least one file included in the file set and displaying the information when the schedule event fragment comprises the file set, wherein information about a single file is incorporated into a content location element of the schedule event fragment when the file set comprises only the single file, and at least one of a content Uniform Resource Identifier (URI) type element comprising information about an encoding type used to group the files included in the file set and a content list type element comprising file list information corresponding to the file set is incorporated into an archive location element of the schedule event fragment when the file set comprises more than one file.

10. The method of claim 9, wherein the generating by the broadcasting server of the ESG comprises setting, by the broadcasting server, an encoding type value included in the content URI type element as a value for indicating that the file set comprises a single file that is transmitted as a single file unit when the file set comprises only the single file.

11. The method of claim 9, wherein the determining by the terminal if the schedule event fragment comprises the information about the file set comprises determining if the schedule event fragment comprises the information about the file set by evaluating encoding type information included in the content location element of the schedule event fragment included in the received ESG.

12. The method of claim 9, wherein the determining, by the terminal, if the schedule event fragment comprises the information about the file set comprises determining, by the terminal, if the schedule event fragment comprises the file set by evaluating the archive location element.

13. The method of claim 11, wherein the evaluating, by the terminal, of the information about the files included in the file set and the displaying of the information comprises, if the received file is the file set, evaluating file list information of the files included in the file set through the content list type element; and displaying the file list information in a position corresponding to the file set on a screen.

14. A method for providing file information in a file download service using broadcasting information, the method comprising:

receiving, from a broadcasting server by a terminal, an Electronic Service Guide (ESG) comprising a content fragment including file information about at least one file included in a file set and information indicating transmission of the file set, wherein the file set is generated by grouping the at least one file provided by the file download service;

determining, by the terminal, if a request for downloadable file information is input;

determining, by the terminal, if the content fragment comprises the information about the file set by evaluating the content fragment if the request for the downloadable file information is input; and evaluating, by the terminal, the information about the at least one file included in the file set and displaying the information if the content fragment comprises the file set, wherein information about a single file is incorporated into a content location element of the schedule event fragment when the file set comprises only the single file, and at least one of a content Uniform Resource Identifier (URI) type element comprising information about an encoding type used to group the files included in the file set and a content list type element comprising file list information corresponding to the file set is incorporated into an archive location element of the content fragment when the file set comprises more than one file.

15. The method of claim 14, wherein the determining by the terminal if the content fragment comprises the information about the file set comprises determining, by the terminal, if the content fragment comprise the file set by evaluating the archive location element of the content fragment.

16. The method of claim 14, wherein the evaluating by the terminal of the information about the files included in the file set and the displaying of the information comprises displaying file list information corresponding to each of the files included in the file set through the content list type element if the content fragment comprises the file set.

17. A terminal for providing file information of files in a file download service using broadcasting information, the terminal comprising:

a receiver for receiving an Electronic Service Guide (ESG);

a memory unit for storing the received ESG;

a display unit for displaying input data and a controller for evaluating a schedule event fragment of the received ESG to determine whether the ESG comprises information about a file set, for evaluating information about at least one file included in the file set if the ESG comprises the information about the file set, and for displaying the information through the display unit, wherein the ESG includes file information about the at least one file included in the file set and information indicating transmission of the file set, and the file set is generated by grouping the at least one file provided by the file download service, wherein information about a single file is incorporated into a content location element of the schedule event fragment when the file set comprises only the single file, and at least one of a content Uniform Resource Identifier (URI) type element comprising information about an encoding type used to group the files included in the file set and a content list type element comprising file list information corresponding to the file set is incorporated into an archive location element of the schedule event fragment when the file set comprises more than one file.

18. The terminal of claim 17, wherein the controller determines if the ESG comprises the information about the file set by evaluating encoding type information included in the content location element.

19. The terminal of claim 17, wherein the controller determines whether the ESG comprises the information about the file set by evaluating the archive location element.

20. The terminal of claim 18, wherein when the ESG comprises the information about the file set, the controller evaluates file list information corresponding to the files included in the file set through the content list type element of the schedule event fragment.

21. The terminal of claim 20, wherein when the ESG comprises the information about the file set, the controller evaluates file list information corresponding to each of the files included in the file set through the content list type element and displays the file list information in a position corresponding to the file set on a screen.

22. The terminal of claim 19, wherein the controller evaluates file list information corresponding to each of the files included in the file set through the content list type element when the ESG comprises the information about the file set.

* * * * *